(12) United States Patent
Shieh et al.

(10) Patent No.: US 10,119,464 B2
(45) Date of Patent: Nov. 6, 2018

(54) ENGINE ASSEMBLY HAVING A COVER

(71) Applicant: Toyota Motor Engineering & Manufacturing North America, Inc., Erlanger, KY (US)

(72) Inventors: Tenghua Tom Shieh, Ann Arbor, MI (US); Swetha Minupuri, Ann Arbor, MI (US); Shohei Nomura, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 220 days.

(21) Appl. No.: 15/068,170

(22) Filed: Mar. 11, 2016

(65) Prior Publication Data

US 2017/0260900 A1    Sep. 14, 2017

(51) Int. Cl.
*F02B 75/06*    (2006.01)
*F16F 15/26*    (2006.01)

(52) U.S. Cl.
CPC ............ *F02B 75/06* (2013.01); *F16F 15/264* (2013.01)

(58) Field of Classification Search
CPC .................. F02B 75/06; F16F 15/264
See application file for complete search history.

(56) References Cited

U.S. PATENT DOCUMENTS

| | | | | |
|---|---|---|---|---|
| 4,969,422 A * | 11/1990 | Ishikawa | .................. | F01M 9/06 123/196 R |
| 6,286,474 B1 * | 9/2001 | Downs | ..................... | F02B 67/04 123/192.2 |
| 6,382,165 B1 * | 5/2002 | Hirose | .................. | F16F 15/264 123/192.2 |
| 6,601,557 B1 * | 8/2003 | Hayman | .................. | F01M 1/02 123/192.2 |
| 6,626,139 B1 * | 9/2003 | Horita | ..................... | F16F 15/12 123/192.2 |
| 6,823,829 B1 * | 11/2004 | Kawamoto | .............. | F01M 1/02 123/196 R |

(Continued)

FOREIGN PATENT DOCUMENTS

CN    2576168 Y    10/2003
CN    203214335 U    9/2013

(Continued)

*Primary Examiner* — Hung Q Nguyen
*Assistant Examiner* — Brian P Monahon
(74) *Attorney, Agent, or Firm* — Dinsmore & Shohl LLP

(57) ABSTRACT

An engine assembly having a cover for catching oil splatted by crankshaft gear and a balance shaft gear is provided. The crankshaft gear is mechanically coupled to the balance shaft gear. The balance shaft gear may be partially submerged in a pool of oil formed at the bottom of the crankcase housing. The cover includes a first cover portion having a back wall and a pair of side walls extending along a top portion and a bottom portion. The top portion covers a respective portion of a circumferential edge of the crankshaft gear. The bottom portion a respective portion of a circumferential edge of the balance shaft gear. Accordingly, oil splattered by the crankshaft gear and the balance shaft gear is caught by the cover, reducing oil entrainment and increasing oil pumping efficiency. Further, the cover helps prevent oil mist from escaping the system so as to reduce oil consumption.

20 Claims, 8 Drawing Sheets

(56) References Cited

U.S. PATENT DOCUMENTS

| | | | |
|---|---|---|---|
| 8,100,105 B2 * | 1/2012 | Schober | F16F 15/264 123/192.2 |
| 2004/0206327 A1 * | 10/2004 | Utsumi | F02B 61/02 123/192.2 |
| 2005/0109305 A1 * | 5/2005 | Takeuchi | F02B 61/02 123/192.2 |
| 2006/0096566 A1 * | 5/2006 | Huster | F01M 11/0004 123/192.2 |
| 2006/0130797 A1 * | 6/2006 | Klotz | F01L 1/02 123/192.2 |
| 2007/0079786 A1 * | 4/2007 | Osman | F02B 75/06 123/192.2 |
| 2009/0050100 A1 * | 2/2009 | Terada | F01M 5/002 123/192.2 |
| 2010/0132654 A1 * | 6/2010 | Lee | F02B 75/06 123/192.2 |
| 2010/0154735 A1 * | 6/2010 | Kato | F16F 15/267 123/192.2 |
| 2011/0146614 A1 * | 6/2011 | Wenger | B60K 6/24 123/196 R |
| 2013/0025562 A1 * | 1/2013 | Nagahashi | F01M 5/025 123/196 R |
| 2013/0098327 A1 * | 4/2013 | Ryu | F02B 75/06 123/192.2 |
| 2014/0190442 A1 * | 7/2014 | Saito | F16H 55/18 123/192.2 |
| 2015/0083068 A1 * | 3/2015 | Sugiura | F16F 15/264 123/192.2 |

FOREIGN PATENT DOCUMENTS

| | | |
|---|---|---|
| CN | 204299635 U | 4/2015 |
| WO | 2014/125817 A1 | 8/2014 |

\* cited by examiner

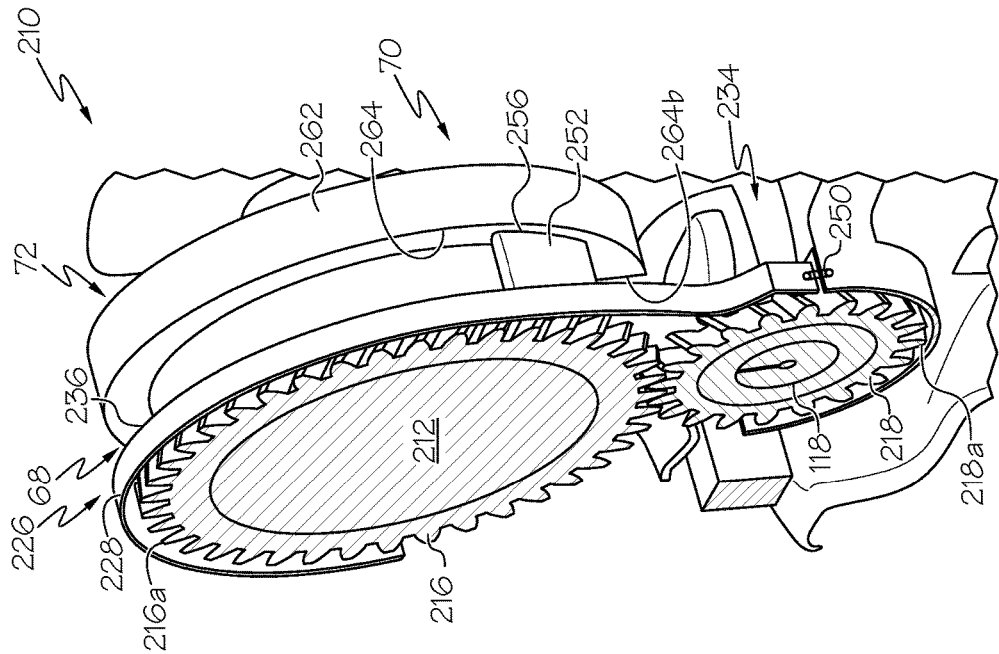
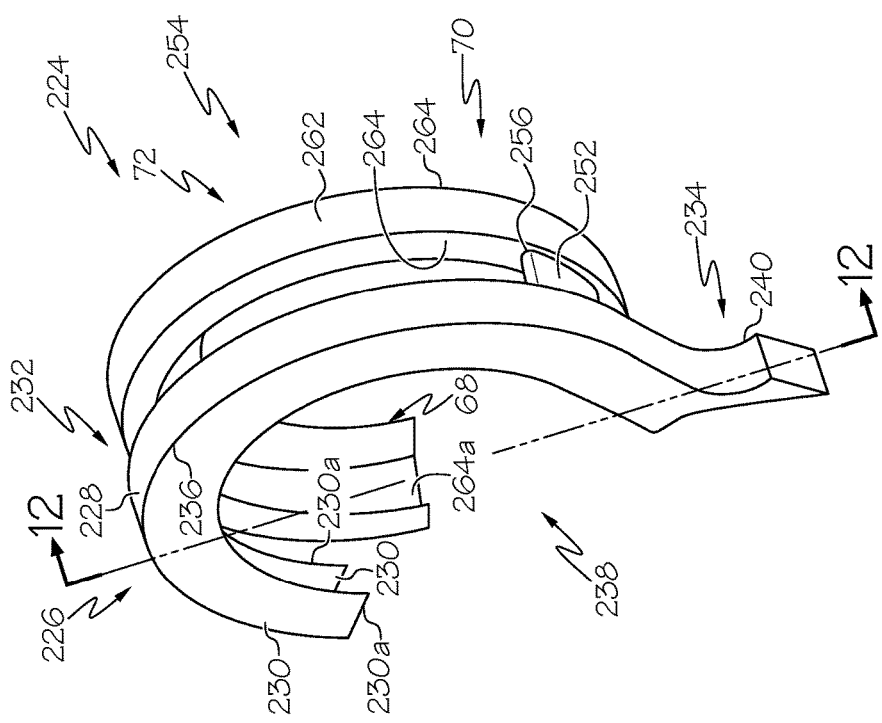

ENGINE ASSEMBLY HAVING A COVER

TECHNICAL FIELD

The present specification generally relates to an engine assembly having a balance shaft having a balance shaft gear mechanically coupled to a crankshaft gear and, more particularly, a cover configured to prevent oil splattered by the balance shaft gear and crankshaft gear from splattering against the inner wall of the crankcase housing so as to retain the efficiency of the oil pump.

BACKGROUND

Internal combustible engines require oil distribution to help prevent moving parts from incurring friction damage. Some internal combustion engines include a balance shaft. The balance shaft is configured to reduce vibration generated by the movement of the opposing pistons.

The balance shaft is mechanically coupled to the crankshaft. In some embodiments of the internal combustible engine, the balance shaft includes a balance shaft gear coupled to a crankshaft gear. The crankshaft may further include a plurality of counter weights rotatable about the crankshaft so as to offset secondary vibrations from the actuation of the pistons.

FIG. 1A is a cross-sectional view of a prior art engine assembly 300. The components of the engine assembly are disposed within a crankcase housing 310. The balance shaft 330 is coupled to the crankshaft 320. A balance shaft gear 340 is fixedly mounted to the balance shaft 330 and includes a plurality of teeth engaged with a crankshaft gear 340 having corresponding teeth. The balance shaft gear 330 is disposed in a lower portion of the crankcase housing where oil may reside.

FIG. 1B is a view of FIG. 1A showing the oil distribution within an operating engine assembly 300. FIG. 1B shows how oil at the bottom of the crankcase housing 310 is splattered throughout the upper portion of the crankcase housing 310. In particular, FIG. 1B shows how the balance shaft gear 340 splatters oil by the teeth of the balance shaft gear 340 scooping oil. As the oil is splattered, the oil becomes entrained. It should be appreciated that entrained oil is not suitable for pumping as entrained oil reduces oil pressure which in turn reduces the efficiency of the pump. It should be further appreciated that the reduction in pumping efficiency may in turn reduce the oil distribution to the engine.

Accordingly, a need exists for an engine assembly configured to reduce the amount of oil being splashed within the crankcase so as to help prevent the generation of entrained oil and maintain the pumping efficiency of an oil pump and reduce oil mist escaping from the positive crankcase ventilation system so as to reduce oil consumption.

SUMMARY

In one embodiment, an engine assembly includes a crankcase, a crankshaft having a crankshaft gear and a balance shaft having a balance shaft gear. The crankshaft gear is mechanically coupled to the balance shaft gear. The crankshaft is configured to rotate the balance shaft by the mechanical connection between the crankshaft gear and the balance shaft gear.

The engine assembly further includes a cover having a first cover portion. The first cover portion includes a back wall and a pair of side walls. The side walls are spaced apart from each other. The first cover portion further includes a top portion and a bottom portion. The back wall of the top portion extends along a first arc. A portion of the first arc is spaced apart from an outer edge of the crankshaft gear. Each of the pair of side walls of the top portion covers a respective portion of a circumferential edge of the crankshaft gear.

The back wall of the bottom portion extends along a second arc. A portion of the second arc is spaced apart from a first radius of the balance shaft gear. Each of the pair of side walls of the bottom portion covers a respective portion of a circumferential edge of the balance shaft gear. Accordingly, cover prevents oil carried up by the rotation of the balance shaft gear from splashing up into the crankcase so as to reduce the amount of oil being splashed within the crankcase and help prevent the generation of entrained oil and maintain the pumping efficiency of an oil pump. Further, the cover helps prevent oil mist from escaping the system so as to reduce oil consumption.

In one embodiment, the cover includes a connecting member and side portion. The side portion is spaced apart from the cover so as to be disposed above an opening of a radius portion of a balance shaft housing. The connecting member is fixed to the bottom portion of the cover and the side portion so as to interconnect the bottom portion of the cover to the side portion. The side portion is in open communication with the opening of the radius portion of the balance shaft housing so as to prevent oil splashing through the opening from being splattered throughout the crankcase housing.

In another embodiment, the side portion includes a second back wall and a pair of second side walls configured to cover a counter weight. The counter weight is rotatably attached to the crankshaft. The second back wall is elevated above a portion of the counter weight. The second back wall extends along a third arc so as to accommodate a rotational path of the counter weight. Each of the pair of second side walls of the side portion is spaced apart from and covers a respective portion of a circumferential edge of the counterweight. The side portion is offset from an apex of the rotational path of the counter weight so as to prevent oil caught on the counter weight from being splattered throughout the crankcase housing.

In another embodiment of the side portion, and the top wall includes a first top wall portion, a second top wall portion and an apex portion. The apex portion is disposed above the apex of the rotational path of the counter weight and interconnects the first top wall portion to the second top wall portion. The first top wall portion and the second top wall portion are offset from the apex of the rotational path of the counter weight so as to prevent oil caught on the counter weight from being splattered throughout the crankcase housing.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

FIG. 11 is an isolated view of a cover according to one or more embodiments described and illustrated herein, wherein the cover is configured to catch oil splattered by a counterweight; and FIG. 12 is a cross-sectional view of the cover shown in FIG. 11 taken along lines 12-12, showing the cover mounted to the balance shaft housing.

DETAILED DESCRIPTION

Referring generally to the figures, embodiments of the present disclosure are directed to engine assemblies having a crankcase housing configured to accommodate, among the components of an internal combustion engine, a balance shaft and a balance shaft gear. The balance shaft gear mechanically couples the balance shaft to a crankcase shaft. The engine assembly includes a cover configured cover the balance shaft gear and crankcase gear so as to catch oil being thrown by the crankshaft gear and the balance shaft gear, reducing the generation of entrained oil and maintain the pumping efficiency of an oil pump. Further, the cover helps prevent oil mist from escaping the system so as to reduce oil consumption.

The cover includes a first cover portion having a back wall and a pair of side walls extending along a top portion and a bottom portion. The top portion covers a respective portion of a circumferential edge of the crankshaft gear. The bottom portion a respective portion of a circumferential edge of the balance shaft gear.

The cover may further include a side portion. In one embodiment, the side portion is configured to prevent oil splattered by a reduction gear from being thrown against the inner walls of the crankcase housing. In another embodiment, the side portion is configured to catch oil thrown by a counter weight. Accordingly, oil splattered by the operation of the crankshaft gear, balance shaft gear, reduction gear and counterweight is caught by the cover, reducing oil entrainment and maintaining pumping efficiency.

Figure 1A:
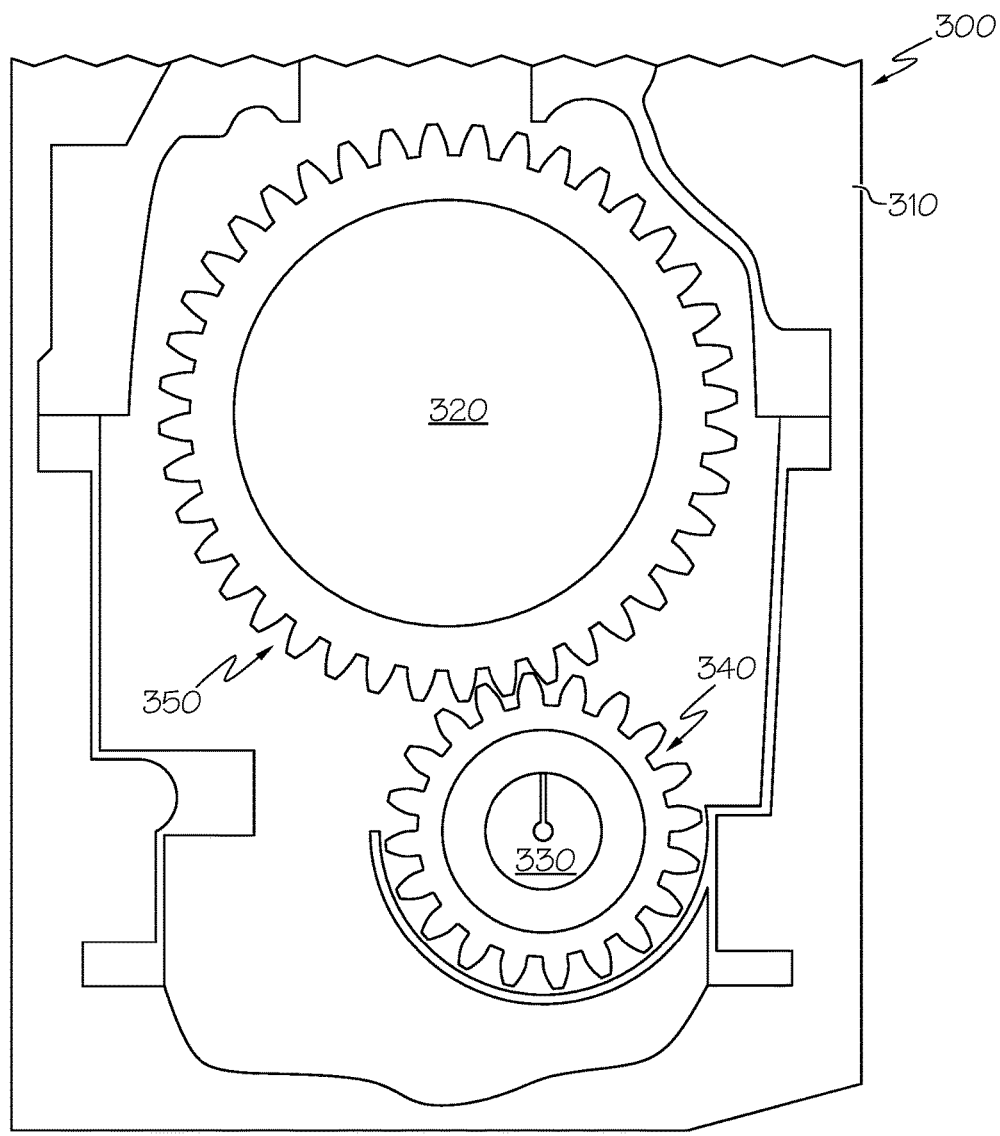
FIG. 1A schematically depicts a cross-sectional view of a prior art engine assembly.
Figure 1B:
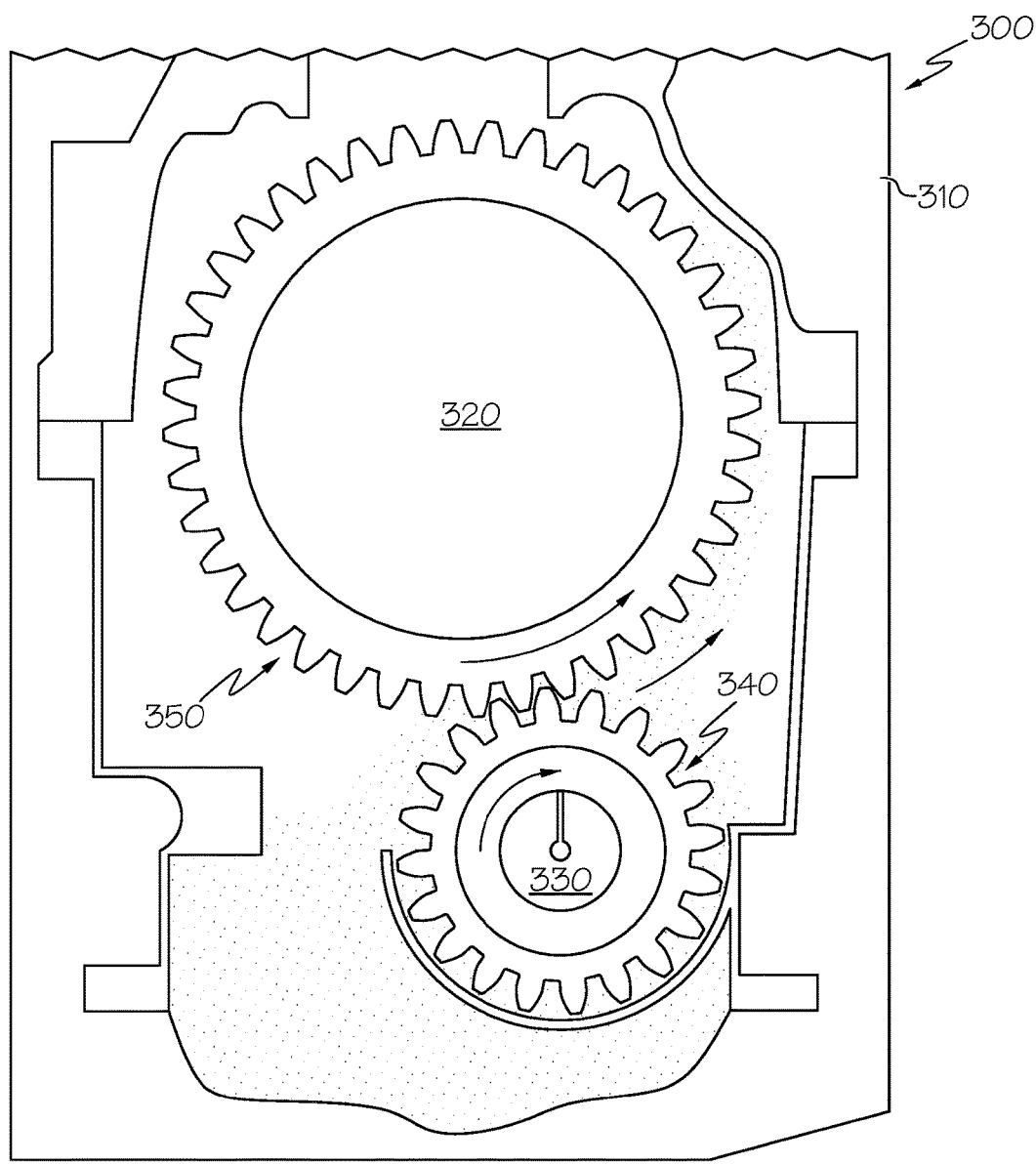
FIG. 1B schematically depicts the balance shaft gear of the engine assembly in shown in FIG. 1A splattering oil within the crankcase housing.
Figure 2:
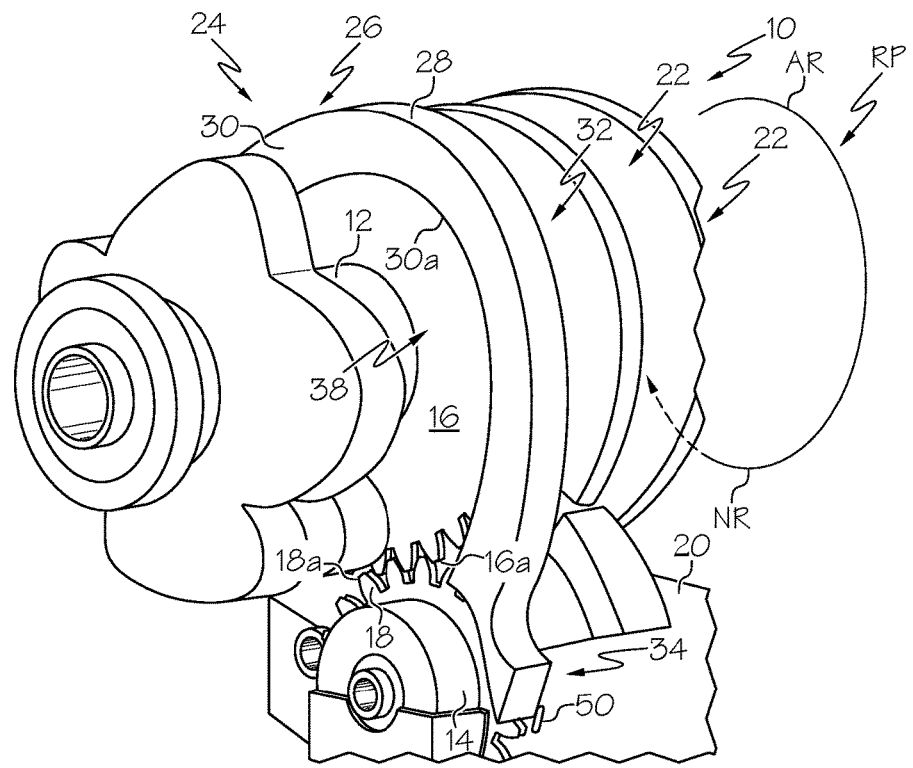
FIG. 2 schematically depicts an engine assembly according to one or more embodiments described and illustrated herein.
Figure 3:
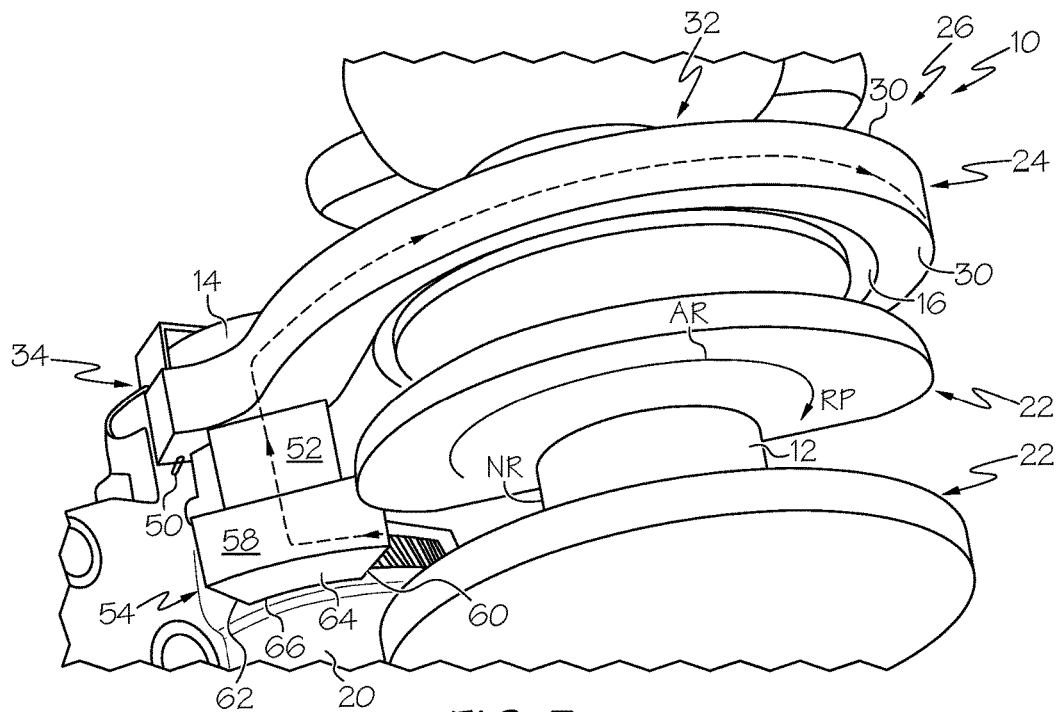
FIG. 3 is another perspective view of the engine assembly shown in FIG. 2.

Referring now to FIGS. 2 and 3 an engine assembly 10 is provided. The engine assembly 10 includes a crankcase housing (not shown, but generally depicted in FIGS. 1A and 1B). The crankcase housing is configured to hold the components of an internal combustion engine. In particular, the crankcase housing is configured to hold a crankshaft 12 and a balance shaft 14 (FIG. 2). The crankshaft 12 is mechanically coupled to the balance shaft 14 so as to rotate the balance shaft 14 in chorus with the rotation of the crankshaft 12.

A crankshaft gear 16 is fixedly mounted to the crankshaft 12. The crankshaft gear 16 is a disc having a plurality of teeth disposed on the peripheral edge of the disc. A balance shaft gear 18 is fixedly mounted to the balance shaft 14. The balance shaft gear 18 is a disc having a plurality of teeth disposed on the peripheral edge of the disc. The balance shaft 14 is disposed below the crankshaft 12 wherein the teeth of the crankshaft gear 16 and the teeth of the balance shaft gear 18 are engaged so as to rotate the balance shaft 14. The balance shaft 14 is partially housed in a balance shaft housing 20. The balance shaft 14 is configured to dampen vibration from the operation of the crankshaft 12.

The engine assembly 10 may further include a counter weight 22 configured to also reduce secondary vibration generated by the operation of the opposing pistons. The counter weights 22 are fixedly mounted to the crankshaft 12 so as to rotate and offset the vibrations generated by the reciprocating pistons. The engine assembly 10 illustratively shows a crankshaft 14 having two (2) counter weights 22, but it should be appreciated that one or more counter weights 22 may be mounted to the crankshaft 14 in order to achieve a desired frequency configured to offset the secondary vibration. The counter weight 22 is illustratively shown as having a wedge shape, but the physical dimensions of the counter weight 22 may be dimensioned otherwise in order to generate a predetermined frequency. The counter weights 22 are fixedly mounted to the crankshaft 12 so as to rotate and offset the vibrations generated by the reciprocating pistons.

FIGS. 2 and 3 show the crankshaft gear 16 mechanically coupled to the balance shaft gear 18. It should be appreciated that the rotation of the crankshaft gear 16 and the balance shaft gear 18 splatters oil, as generally depicted in FIG. 1B. In one instance, the balance shaft gear 18 may be partially submerged in oil, and the teeth scoop the oil upwardly. In another instance, oil caught within the teeth of the crankshaft gear 16 is splattered by the rotation of the crankshaft 12.

The engine assembly 10 includes a cover 24. The cover 24 is configured to catch oil thrown from the crankshaft gear 16 and the balance shaft gear 18. The cover 24 is generally dimensioned in the shape of a question mark. The cover 24 is disposed over the crankshaft gear 16 and the balance shaft gear 18.

Figure 4:
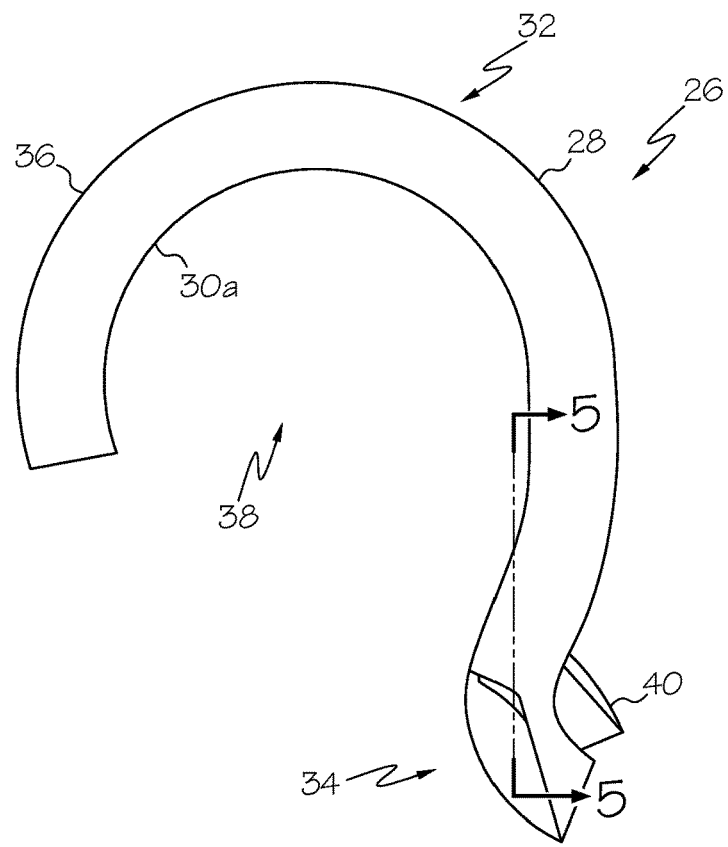
FIG. 4 is side view of the cover shown in FIG. 2.
Figure 5:
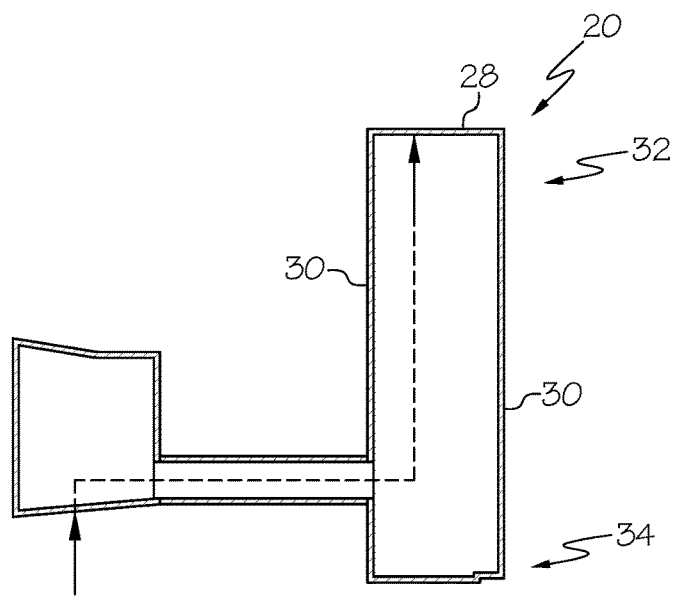
FIG. 5 is a cross-sectional view of the cover shown in FIG. 4 taken along lines 5-5.
Figure 6:
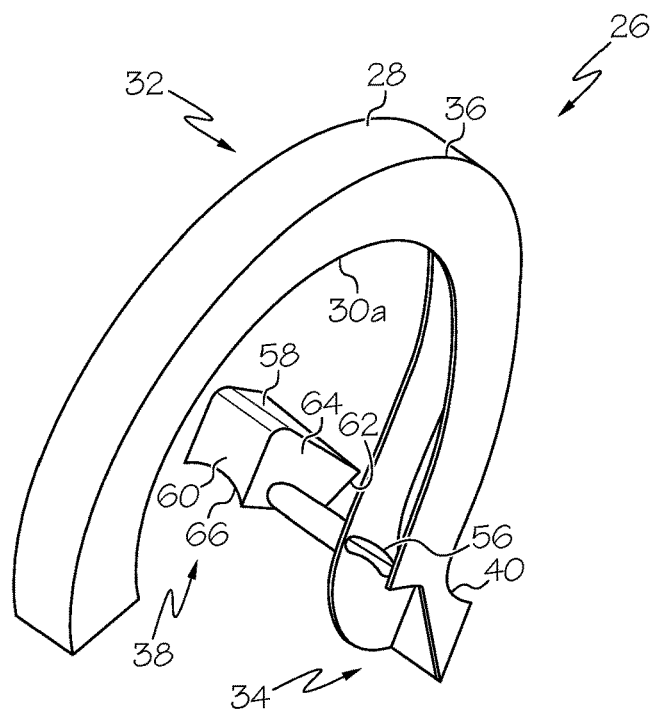
FIG. 6 is a perspective view of the cover shown in FIG. 4.
Figure 7:
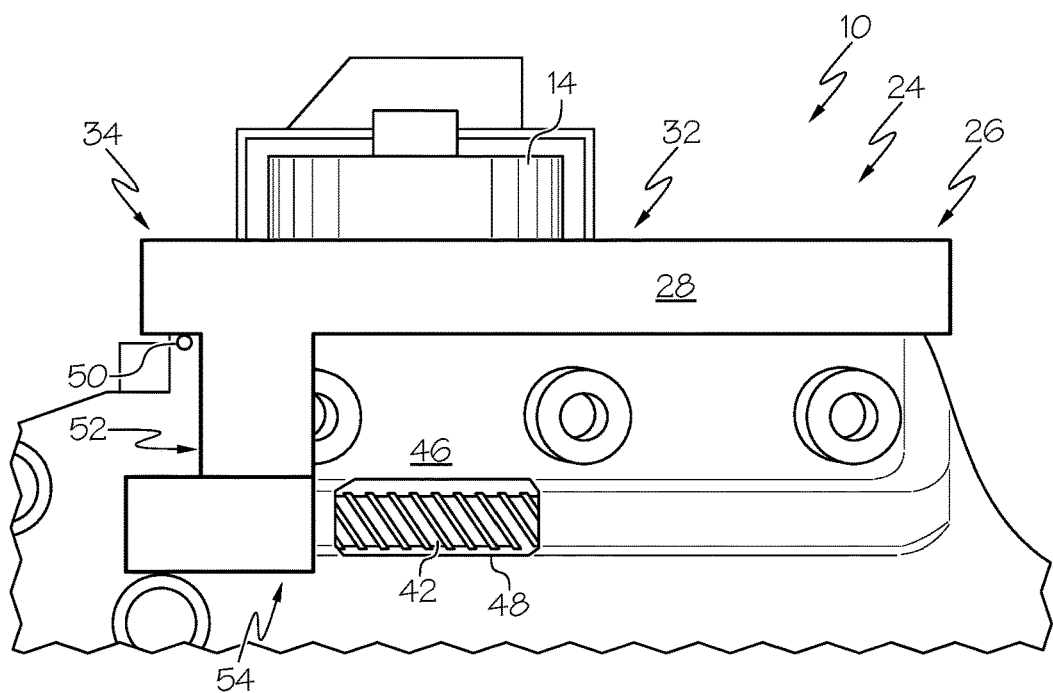
FIG. 7 is top down view of the engine assembly shown in FIG. 2.

FIGS. 4-6 provide an isolated view of the cover 24. The cover 24 includes a first cover portion 26. The first cover portion 26 includes a back wall 28 and a pair of side walls 30 extending the entire length of the first cover portion 26. The side walls 30 are spaced apart from each other and are generally orthogonal to the back wall 28 so as to form a generally U-shaped cross section, as seen in FIG. 5.

The first cover portion 26 further includes a top portion 32 and a bottom portion 34. The top portion 32 has a generally arcuate profile. The back wall 28 of the top portion 32 extends along a first arc 36. The back wall 28 is spaced apart from a circumferential edge 16a of the crankshaft gear 16, as illustratively shown in FIGS. 10 and 12. Each of the pair of side walls 30 of the top portion 32 covers a respective portion of a circumferential edge of the crankshaft gear 16. The side walls 30 have a peripheral edge 30a generally extending along a first radius so as to define a side opening 38 on each side of the crankshaft gear 16. Accordingly, the top portion 32 is positioned and dimensioned to catch oil thrown from the rotating crankshaft gear 16, but is spaced apart from the crankshaft gear 16 so as to not interfere with the operation of the crankshaft gear 16.

With reference again to FIGS. 2-6, a description of the bottom portion 34 of the first cover portion 26 is provided. The bottom portion 34 of the first cover portion 26 may be integrally formed to the top portion 32. The back wall 28 of the bottom portion 34 extends along a second arc 40. The back wall 28 of the bottom portion 34 is spaced apart from the outer circumferential edge of the balance shaft gear 18. Each of the pair of side walls 30 of the bottom portion 34 is spaced apart from respective side surfaces of the balance shaft gear 18. Accordingly, the bottom portion 34 covers a respective portion of a circumferential edge of the balance shaft gear 18 and the circumferential edge 18a of the balance shaft gear 18 so as to catch oil thrown by the rotating balance shaft gear 18.

Figure 8:
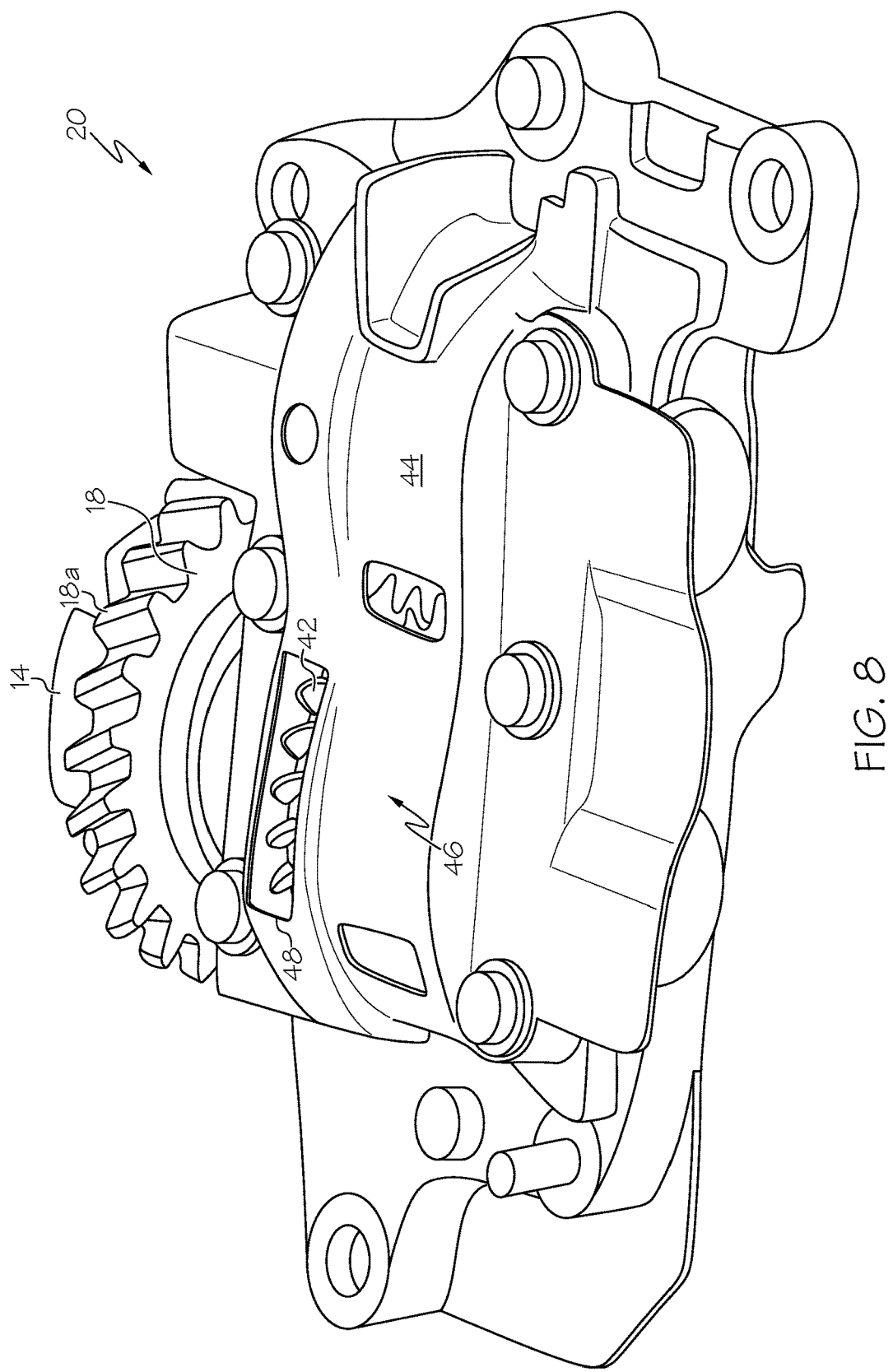
FIG. 8 is a top down view of a balance shaft housing.

With reference now to FIG. 8, an illustrative view of a balance shaft housing 20 is provided. The balance shaft housing 20 is configured to cover components of a balance shaft assembly, to include a reduction gear 42. The reduction gear 42 is configured to reduce the rotational speed of the balance shaft 14 relative to the crankshaft 12 so as to reduce vibration. The balance shaft housing 20 may be formed of a durable and rigid material configured to withstand the operating temperature of the engine assembly 10, such as steel.

The balance shaft housing 20 includes a cover plate 44. The cover plate 44 is configured to protect the components of the balance shaft assembly. The cover plate 44 is shown mechanically attached to a portion of the crankcase housing. The cover plate 44 is disposed beneath the crankshaft gear 16.

The cover plate 44 includes a radius portion 46. The radius portion 46 includes an opening 48. The opening 48 is provided to accommodate a counter weight 22 fixedly mounted to the crankshaft 12. The counter weight 22 is illustratively shown as a wedged shaped member. The counter weight 22 is rotated about the crankshaft 12 so as to travel in a rotational path "RP" (as indicated by the arrow shown in FIG. 3). It should be appreciated that as the counter weight 22 travels to the nadir of the rotational path "NR" the opening 48 of the radius portion 46 provides a clear path of travel. The opening 48 is illustratively shown as being rectangular. However, it should be appreciated that the opening 48 may be dimensioned otherwise so as to accommodate the rotation of the counter weight 22.

With reference again to FIGS. 2 and 3, an illustrative depiction of a post 50 securing the cover 24 to the engine assembly 10 is provided. The post 50 is configured to hold the cover 24 in a fixed position relative to the crankshaft gear 16 and the balance shaft gear 18. The post 50 is illustratively shown as an elongated member connecting the cover 24 to the balance shaft housing 20. In particular, one end of the post 50 may be fixedly mounted to the balance shaft 14 cover 24 and the other end of the post 50 may be fixedly mounted to the cover 24. The post 50 may be welded to the balance shaft 14 cover 24, or mechanically attached thereto by a coupling means such as a bolt or the like.

With reference again to FIGS. 4-6, the cover 24 may further include a connecting member 52 and a side portion 54 (FIG. 3). The side portion 54 is spaced apart from the cover 24 so as to be disposed above the opening 48 of the radius portion 46 (FIG. 8). One end of the connecting member 52 is fixed to the bottom portion 34 and the other end of the connecting member 52 is fixed to the side portion 54 so as to interconnect the bottom portion 34 to the side portion 54. The connecting member 52 may be a generally elongated member having a passage 56 (FIG. 6) placing the side portion 54 in fluid communication with the first cover portion 26, as generally depicted in FIG. 5.

With reference to FIGS. 3 and 6, the side portion 54 includes a top wall 58, a front wall 60, a second back wall 62 and a pair of second side walls 64 so as to form a side portion opening 66. FIG. 3 shows the side portion opening 66 in communication with the opening 48 of the cover plate 44. FIG. 3 also shows how the side portion 54 is displaced from the rotational path "RP" of the counter weight 22.

The cover 24 may be formed of a durable and rigid material configured to withstand the operating temperatures within the engine assembly 10. For instance, the cover 24 may be made of steel. The cover 24 may be formed as a single unit, or may be formed by attaching the components together. The first cover portion 26 may be formed as a single unit, as shown in FIGS. 2-7. Alternatively, the top portion 32 and the bottom portion 34 may be formed as separate units, and fixed together by any fixing means currently known and used in the art, illustratively including welding or a mechanical fastener such as a nut and bolt.

In operation, an oil pump (not shown) distributes oil throughout the engine assembly 10. The distributed oil collects at the bottom of the crankcase housing as generally depicted in FIG. 1B. The collected oil may form a pool, wherein the balance shaft gear 18 may be partially submerged in the pool of oil. It should be appreciated that a drain hole is disposed at the bottom of the crankcase housing. Oil flows through the drain hole and is redistributed through the engine assembly 10 via the oil pump.

As the crankshaft 12 is actuated, the crankshaft gear 16 engages the balance shaft gear 18, rotating the balance shaft 14. Simultaneously, the teeth of the balance gear shaft 18 scoop oil upwardly into the bottom portion 34 of the cover 24. Likewise, oil caught in the teeth of the crankshaft gear 16 is thrown into the top portion 32 of the cover 24. It should be further appreciated that the reduction gear 42 may also be partially submerged in a pool of oil. The reduction gear 42 rotates in response to the balance shaft 14. Oil thrown upwardly by the reduction gear 42 is caught by the side portion 54.

Oil caught by the top portion 32 and bottom portion 34 of the cover drips down onto the floor of the crankcase housing. The oil caught by the side portion 54 may be drawn into the cover 24 via the passage. Accordingly, the cover 24 prevents oil carried up by the rotation of the balance shaft gear 18 from splashing up into the crankcase so as to reduce the amount of oil being splashed within the crankcase and help prevent the generation of entrained oil and maintain the pumping efficiency of an oil pump. Further, the cover helps prevent oil mist from escaping the system so as to reduce oil consumption.

Figure 10:
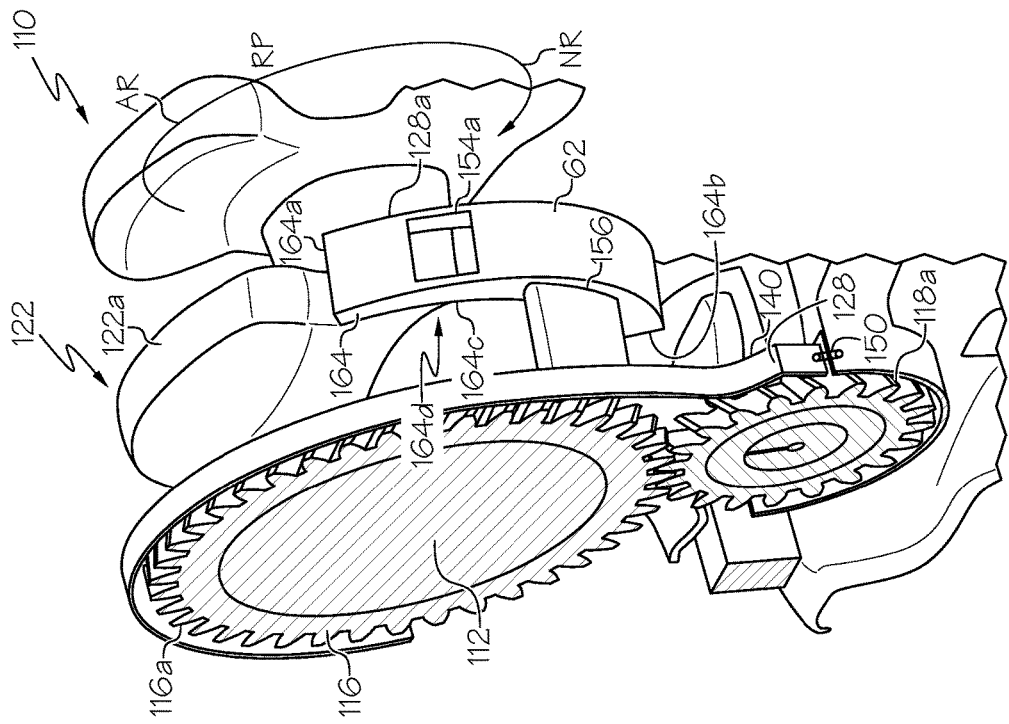
FIG. 10 is a cross-sectional view of the cover shown in FIG. 9 taken along lines 10-10, showing the cover mounted to the balance shaft housing.
Figure 9:
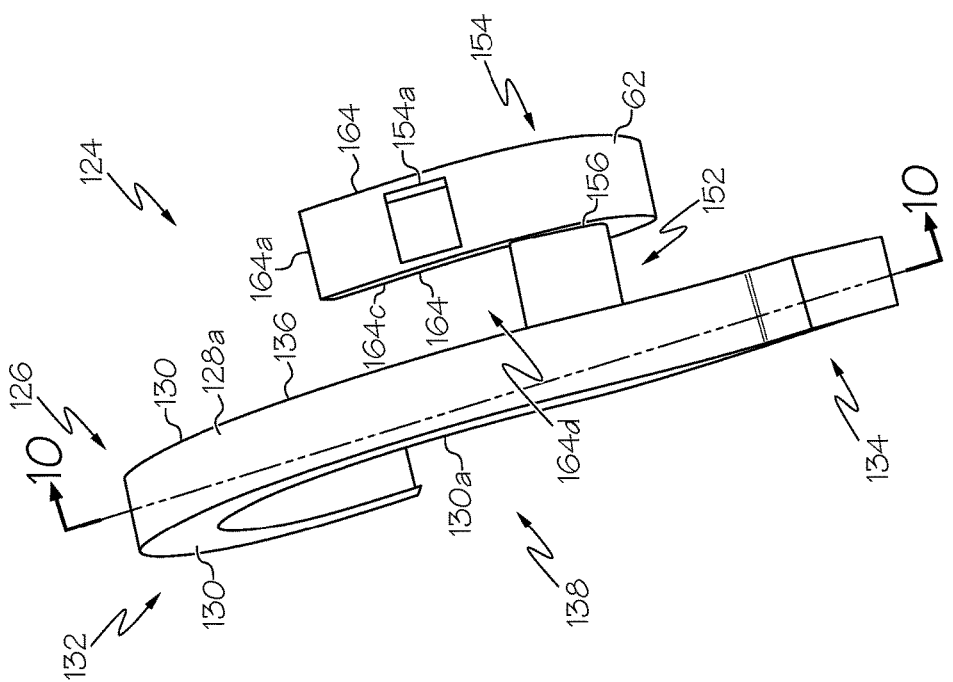
FIG. 9 is an isolated view of a cover according to one or more embodiments described and illustrated herein, wherein the cover is configured to catch oil splattered by a counterweight.

With reference now to FIGS. 9 and 10 a second embodiment of the cover 124 is provided, wherein like elements are referenced by like numbers increased by 100. FIG. 9 is an isolated view of the second embodiment of the cover 124. The cover 124 includes a first cover portion 126. The first cover portion 126 includes a back wall 128 and a pair of side walls 130 extending the entire length of the first cover portion 126. The side walls 130 are spaced apart from each other and are generally orthogonal to the back wall 128 so as to form a generally U-shaped cross section.

The first cover portion 126 further includes a top portion 132 and a bottom portion 134. The top portion 132 has a generally arcuate profile. The back wall 128 of the top portion 132 extends along a first arc 136. The back wall 128 is spaced apart from a circumferential edge 116a of the crankshaft gear 116. The crankshaft gear 116 is fixedly mounted to a crankshaft 112.

Each of the pair of side walls 130 of the top portion 132 covers a respective portion of a circumferential edge 116a of the crankshaft gear 116. The side walls 130 have a peripheral edge 130a generally extending along a second radius so as to define a side opening 138 on each side of the crankshaft gear 116. Accordingly, the top portion 132 is positioned and dimensioned to catch oil thrown from the rotating crankshaft gear 116, but is spaced apart from the crankshaft gear 116 so as to not interfere with the operation of the crankshaft gear 116.

The bottom portion 134 of the first cover portion 126 is provided. The bottom portion 134 of the first cover portion 126 may be integrally formed to the top portion 132. The back wall 128 of the bottom portion 134 extends along a second arc 140. The back wall 128 of the bottom portion 134 is spaced apart from the circumferential edge 118a of the balance shaft gear 118. Each of the pair of side walls 130 of the bottom portion 134 is spaced apart from respective side surfaces of the balance shaft gear 118. Accordingly, the bottom portion 134 covers a respective portion of a circumferential edge of the balance shaft gear 118 and the peripheral edge of the balance shaft gear 118 so as to catch oil thrown by the rotating balance shaft gear 118.

The cover 124 further includes a connecting member 152 and side portion 154. The side portion 154 is spaced apart from the first cover portion 126. The connecting member 152 is fixed to the bottom portion 134 of the first cover portion 126. The connecting member 152 is generally orthogonal to the side wall 130 of the bottom portion 134. The connecting member 152 interconnects the bottom portion 134 of the cover 124 to the side portion 154. The connecting member 152 may be a generally elongated member. The connecting member 152 includes a passage 156 placing the side portion 154 in fluid communication with the first cover portion 126, as generally depicted in FIG. 5.

FIG. 10 is a cross-sectional view of FIG. 9 taken along lines 10-10 showing the cover 124 mounted to the engine assembly 110. In particular, one end of a post 150 is welded to the bottom portion 134 of the first cover 124 and the other end of the post 150 is mounted to the balance shaft housing 120. FIG. 10 shows the first cover portion 126 covering the crankshaft gear 116 and the balance shaft gear. FIG. 10 also shows the connecting member 152 and an embodiment of the side portion 154 member configured to cover 124 the counter weight 122.

In a second embodiment, the side portion 154 includes a second back wall 62 and a pair of second side walls 164 so as to define a pair of open ends 164a, 164b. The second back wall 62 is elevated above a portion of the counter weight 122. The second back wall 62 extends along a third arc 128a so as to accommodate a rotational path "RP" (indicated by the arrow shown in FIG. 10) of the counter weight 122. The second back wall 62 of the side portion 154 includes a second opening 154a. The second opening 154a is illustratively shown as being rectangular. The second opening 154 provides a passage for which air and oil may escape so as to reduce pressure build up within the side portion 154 and facilitate oil drainage.

Each of the pair of second side walls 164 has a peripheral edge 164c defining a second side opening 164d exposing opposing side surfaces of the counter weight 122. Each of the pair of second side walls 164 has of the side portion 154 is spaced apart from and covers a respective portion of a circumferential edge 122a of the counter weight 122. The side portion 154 is offset from an apex of the rotational path "AR" of the counter weight 122 so as to prevent oil caught on the counter weight 122 from being splattered throughout the crankcase housing.

In operation, the crankshaft 112 is rotated, wherein the crankshaft gear 116 engages the balance shaft gear 118 so as to rotate the balance shaft 114. As the balance shaft 114, crankshaft 116, crankshaft gear 116 and balance shaft gear 118 are rotated, oil is thrown upwardly and outwardly. The top portion 132 and bottom portion 134 of the first cover portion 126 catch oil thrown respectively from the crankshaft gear 116 and the balance shaft gear 118. Thus oil splattered by the crankshaft gear 116 and the balance shaft gear 118 is prevented from hitting the inner walls of the crankcase housing and reducing entrainment.

As the crankshaft 112 is rotated, the counter weight 122 is moved along its rotational path "RP". Oil is thrown from the counter weight 122 as the counter weight 122 moves from the nadir of the rotational path "NR" to the apex of the rotational path "AR". The side portion 154 catches the oil thrown by the counter weight 122 as the side portion 154 is offset from the apex of the rotational path "AR" of the counter weight 122. In particular, the oil is thrown onto the second back wall 62 and the second side walls 164 of the side portion 154. Oil caught by the side portion 54 may drip down onto the balance shaft 114 cover 124. Further, the rotation of the crankshaft gear 116 helps draw oil from the side portion 154 into the first cover portion 126 via the connecting member 152. In particular, oil may be drawn into the first cover portion 126 via the passage 156 of the connecting member 152 as generally depicted in FIG. 5. Oil passing through the connecting member 152 may then fall into the crankcase housing by an open end of the first cover portion 126.

With reference now to FIGS. 11 and 12, a third embodiment of the cover 224 is provided, wherein like elements are referenced by like numbers increased by 200. FIG. 11 is an isolated view of the third embodiment of the cover 224 wherein the side portion 254 is configured to cover 224 an apex of the rotational path "AR" of the counter weight 222.

The first cover portion 226 further includes a top portion 232 and a bottom portion 234. The top portion 232 has a generally arcuate profile. The back wall 228 of the top portion 232 extends along a first arc 236. The back wall 228 is spaced apart from a circumferential edge 216a of the crankshaft gear 216. The crankshaft gear 216 is fixedly mounted to a crankshaft 212.

Each of the pair of side walls 230 of the top portion 232 covers a respective portion of a circumferential edge 216a of the crankshaft gear 216. The side walls 230 have a peripheral edge 230a generally extending along a second radius so as to define a side opening 238 on each side of the crankshaft gear 216. Accordingly, the top portion 232 is positioned and dimensioned to catch oil thrown from the rotating crankshaft gear 216, but is spaced apart from the crankshaft gear 216 so as to not interfere with the operation of the crankshaft gear 216.

The bottom portion 234 of the first cover portion 226 is provided. The bottom portion 234 of the first cover portion 226 may be integrally formed to the top portion 232. The back wall 228 of the bottom portion 234 extends along a second arc 240. The back wall 228 of the bottom portion 234 is spaced apart from the circumferential edge 218a of the balance shaft gear 218. Each of the pair of side walls 230 of the bottom portion 234 is spaced apart from respective side surfaces of the balance shaft gear 218. Accordingly, the bottom portion 234 covers a respective portion of a circumferential edge 218a of the balance shaft gear 218 and the peripheral sides of the balance shaft gear 218 so as to catch oil thrown by the rotating balance shaft gear 218.

The cover 124 further includes a connecting member 252 and side portion 254. The side portion 254 is spaced apart from the first cover portion 226. The connecting member 252 is fixed to the bottom portion 234 of the first cover portion 226. The connecting member 252 is generally orthogonal to the side wall 230 of the bottom portion 234. The connecting member 252 interconnects the bottom portion 234 of the cover 224 to the side portion 254. The connecting member 252 may be a generally elongated member. The connecting member 252 includes a passage 256 placing the side portion 254 in fluid communication with the first cover portion 226, as generally depicted in FIG. 5.

The side portion 254 includes a second back wall 262 and a pair of second side walls 264 so as to define a pair of open ends 264a, 264b. The side portion 254 further includes a first top wall portion 68, a second top wall portion 70 and an apex portion 72. The second back wall 62 and the pair of second side walls 264 extend along the first top wall portion 68, second top portion 232 and the apex portion 72. The apex portion 72 interconnects the first top wall portion 68 to the second top wall portion 70.

With reference now to FIG. 12, the apex portion 72 is disposed above an apex of a rotational path "AR" of the counter weight 22 (the apex of the rotational path is shown in FIG. 10). The first top wall portion 68 is contiguous with one end of the apex portion 72 and the second top wall portion 70 is contiguous with the other end of the apex portion 72 so as to place the first top wall portion 68 and the second top wall portion 70 offset from the apex of the rotational path "AR" of the counter weight 222. Accordingly, the side portion 254 of the third embodiment is configured to catch oil thrown upwardly by the rotating counter weight 222.

The connecting member 252 is illustratively shown interconnecting the second top wall portion 70 of the side portion 254 to the bottom portion 234 of the first cover portion 226. The connecting member 252 may be a generally elongated member having a passage 256, as illustratively shown in FIG. 5. The passage 256 is configured to place the bottom portion 234 of the first cover portion 226 in fluid communication with the side portion 254.

In operation, the crankshaft 212 is rotated, wherein the crankshaft gear 216 engages the balance shaft gear 218 so as to rotate the balance shaft 214. As the balance shaft 214, crankshaft 216, crankshaft gear 216 and balance shaft gear 218 are rotated, oil is thrown upwardly and outwardly. The top portion 232 and bottom portion 234 of the first cover portion 226 catch oil thrown respectively from the crankshaft gear 216 and the balance shaft gear 218.

As the crankshaft 212 is rotated, the counter weight 222 is moved along its rotational path "RP". Oil is thrown from the counter weight 222 as the counter weight 222 moves from the nadir of the rotational path "NR" to the apex of the rotational path "AR", and also from the apex of the rotational path "AR" to the nadir of the rotational path "NR", as generally depicted in FIG. 10.

The side portion 254 of the third embodiment is configured to catch oil thrown by the counter weight 22 as counterweight 222 moves from the from the nadir of the rotational path "NR" to the apex of the rotational path "AR", and also from the apex of the rotational path "AR" to the nadir of the rotational path "NR". Accordingly, oil being splattered upwardly by the counter weight 222 is caught.

Oil caught by the side portion 254 may drip down onto the cover plate 244. Further, the rotation of the crankshaft gear 216 helps draw oil from the side portion 254 into the first cover portion 226 via the connecting member 252. In particular oil may be drawn into the first cover portion 226 via the passage 256 of the connecting member 252 as generally depicted in FIG. 5. Oil passing through the connecting member 252 may then fall into the crankcase housing by an open end of the first cover portion 226.

As illustrated above, various embodiments of an engine assembly 10 having a cover 24 configured to catch oil splattering from moving components are disclosed. The cover 24 is configured to catch oil being splattered by the crankshaft gear 16, balance shaft gear and the counter weight 22 so as to minimize the entrainment of oil. Further, the oil is directed towards the bottom of the crankcase in a form suitable for pumping so as to maintain the efficiency of the pump and the lubrication of the engine assembly 10.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An engine assembly having a crankcase, a crankshaft having a crankshaft gear and a balance shaft having a balance shaft gear, the crankshaft gear and the balance shaft gear each having a radial side, the crankshaft gear mechanically coupled to the balance shaft gear, the engine assembly comprising: a cover having a first cover portion, the first cover portion comprising a top portion and a bottom portion, the top portion comprising a back wall and a pair of side walls, a bottom portion comprising the back wall and the pair of side walls; the back wall of the top portion extends along a first arc, a portion of the first arc being spaced apart from an outer edge of the crankshaft gear, and wherein each of the pair of side walls of the top portion covers a respective portion of a circumferential edge of the crankshaft gear, the pair of side walls are spaced apart from the back wall of the top portion and the back wall of the bottom portion, the pair of side walls extending to a distal edge so as to define a side opening on either side, wherein the radial sides of the crankshaft gear and the balance shaft gear are at least partially exposed; and the back wall of the bottom portion extends along a second arc, a portion of the second arc being spaced apart from a first radius of the balance shaft gear, and wherein each of the pair of side walls of the bottom portion covering a respective portion of a circumferential edge of the balance shaft gear.

2. The engine assembly of claim 1, wherein the top portion extends along the first arc comprising a constant radius.

3. The engine assembly of claim 1, wherein the second arc curves away from the top portion.

4. The engine assembly of claim 1, further including a balance shaft housing having a cover plate, the cover plate having a radius portion configured to cover a reduction gear, the radius portion having an opening.

5. The engine assembly of claim 4, further including a post, the post connecting the cover to the balance shaft housing.

6. The engine assembly of claim 5, wherein the cover includes a connecting member and side portion, the side portion spaced apart from the cover so as to be disposed above the opening of the radius portion, the connecting member fixed to the bottom portion and the side portion so as to interconnect the bottom portion to the side portion.

7. The engine assembly of claim 6, wherein the connecting member is a generally elongated member having a passage, the passage placing the side portion in fluid communication with the first cover portion.

8. The engine assembly of claim 7, wherein the side portion includes a top wall, a front wall, a second back wall and a pair of second side walls so as to form a side portion opening, the side portion opening in communication with the opening of the cover plate of the balance shaft housing.

9. The engine assembly of claim 7, wherein the balance shaft further includes a counter weight, the counter weight and the side portion displaced from a rotational path of the counter weight.

10. The engine assembly of claim 7 further including a counter weight mounted to the crankshaft and the side portion includes a second back wall and a pair of second side walls, the second back wall being elevated above a portion of the counter weight, the second back wall extending along a third arc so as to accommodate a rotational path of the counter weight, and wherein each of the pair of second side walls of the side portion is spaced apart from and covers a respective portion of a circumferential edge of the counter weight.

11. The engine assembly of claim 10, wherein the post is attached to the balance shaft housing at one end and the cover at the other end.

12. The engine assembly of claim 11, wherein the second back wall of the side portion includes a second opening.

13. The engine assembly of claim 11, wherein the side portion is offset from an apex of the rotational path of the counter weight.

14. The engine assembly as set forth in claim 11, wherein each of the pair of second side walls are generally orthogonal to the second back wall and spaced apart from each other so as to form a generally U-shaped cross section.

15. The engine assembly of claim 11, wherein the pair of second side walls have a second peripheral edge generally extending along a second radius so as to define a second side opening on each side of the counter weight.

16. The engine assembly of claim 8, further including a counter weight mounted to the crankshaft, and the side portion includes a first top wall portion, a second top wall portion and an apex portion, the apex portion being disposed above an apex of a rotational path of the counter weight and interconnecting the first top wall portion to the second top wall portion so as to place the first top wall portion and the second top wall portion is offset of the apex of the rotational path of the counter weight.

17. The engine assembly of claim 16, wherein each of the pair of second side walls are generally orthogonal to the top wall and spaced apart from each other so as to form a generally U-shaped cross section.

18. The engine assembly of claim 17, wherein the pair of second side walls have a second peripheral edge generally extending along a second radius so as to define a second side opening on each side of the counter weight.

19. The engine assembly of claim 16, wherein the top wall is a continuous surface.

20. The engine assembly of claim 17, wherein the post is attached to the balance shaft housing at one end and the cover at the other end.

* * * * *